TRANSISTOR TRIGGER CIRCUITS

Filed Dec. 30, 1957

INVENTOR.
WAYNE W. CHOU

BY Lester H. Clark

ATTORNEY

United States Patent Office 2,947,882

Patented Aug. 2, 1960

2,947,882

TRANSISTOR TRIGGER CIRCUITS

Wayne W. Chou, Stamford, Conn., assignor to International Business Machines Corporation, New York, N.Y., a corporation of New York Filed Dec. 30, 1957, Ser. No. 705,842

1 Claim. (Cl. 307—88.5)

The present invention relates to transistor trigger circuits, and is particularly concerned with trigger circuits of the type utilizing two transistors which are cross coupled so that they alternately switch On and Off, and so that one transistor is On while the other is Off.

There is disclosed in my co-pending application Serial No. 706,041, filed December 30, 1957, a transistor amplifier circuit provided with means which establishes the On condition of the transistor in a linear region of the collector voltage-current characteristics, and thereby prevents the transistor from becoming saturated. In accordance with the present invention, similar principles are applied to a two-transistor trigger circuit, with resulting improved speed of operation of the trigger.

An object of the present invention is to provide an improved transistor trigger circuit.

Another object is to provide a transistor trigger circuit, including improved means for preventing the transistors thereof from becoming saturated.

A further object is to provide a trigger circuit of the type described including means for maintaining the transistors at all times operating in linear portions of their characteristics.

The foregoing and other objects of the invention are attained in the circuit described herein. The circuit includes two transistors, and the collector electrodes of the two transistors are connected to constant current drains. Two constant current sources are connected to the respective base electrodes, and a single constant current source is connected to both emitters. The latter constant current source is constructed to supply only enough current for one transistor to be On at a time. D.C. conductive impedances cross-couple the bases and collectors of the two transistors. Each drain is constructed to carry more current than is supplied by the largest one of the constant current sources, but less than that supplied by two of the constant current sources. A pair of oppositely poled clamping diodes are connected between each collector and a source of fixed potential.

The drain at the collector of the Off transistor receives current from only one of the constant current sources, namely the one connected to the base of the other transistor, that current flowing to the Off collector through one of the cross-coupling impedances. The deficiency in the current for the drain at the Off collector is made up by flow through one of the clamping diodes. The potential at that collector is lower than that of the fixed potential source by the drop across that diode.

The drain at the collector of the On transistor on the other hand, receives current not only from the source connected to the opposite base, but also from the source connected to the emitters. The excess of current for the drain at the On collector flows out through the oppositely poled diode to the fixed potential source. Consequently, the potential at that collector is greater than that of the fixed potential source by the drop across the diode.

The total collector potential swing from Off to On is thus the sum of the drops across two forwardly biased diodes, and is therefore very small.

An amplifier stage is provided which may be connected to the output to produce desired voltage levels.

Other objects and advantages of the invention will become apparent for a consideration of the following specification and claims taking together the accompanying drawing.

FIG. 1

Figure 1:
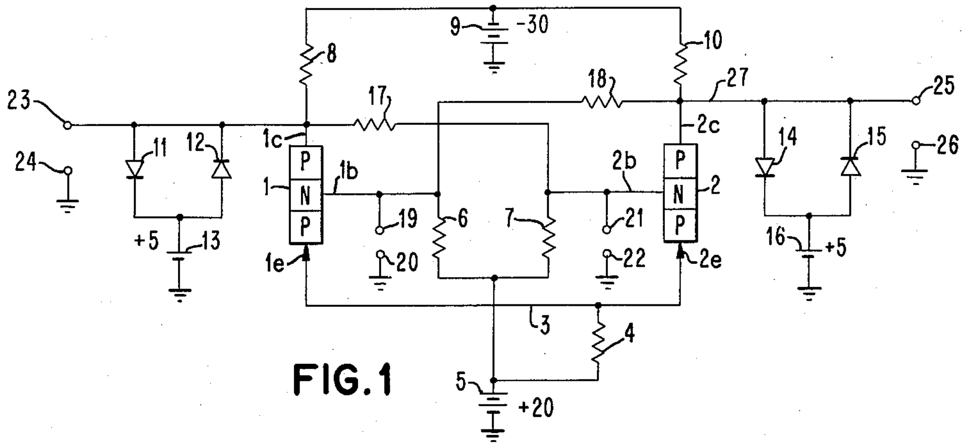
Fig. 1 is a wiring diagram of one form of trigger circuit embodying the invention.

The trigger circuit of this figure employs two PNP junction transistors 1 and 2 having collector electrodes **1*c* and 2*c*, base electrodes 1*b* and 2*b*, and emitter electrodes 1*e* and 2*e***.

The emitters **1*e* and 2*e* are connected together by means of a wire 3 and thence through a resistor 4 and a battery 5 to ground. Resistor 4 and battery 5 together provide a constant current source. Base electrode 1*b* is connected through a resistor 6 and battery 5 to ground. Base electrode 2*b* is similarly connected through resistor 7 and a battery 5 to ground. Resistors 6 and 7 cooperate with the battery 5** to provide two substantially constant current sources.

Collector electrode **1*c* is connected through a resistor 8 and a battery 9 to ground. Collector electrode 2*c* is similarly connected through a resistor 10 and the battery 9 to ground. The resistors 8 and 10 have relattively high impedances, and provide substantially constant current drains for the collectors 1*c* and 2*c***.

Although some of the resistor-battery combinations are termed "sources" herein, and other such combinations are termed "drains" it should be realized that these different terms are employed to emphasize the particular current flow directions employed in the circuit illustrated, and that the invention is not limited to any particular direction of flow.

Collector **1*c* is connected through parallel oppositely poled diodes 11 and 12 to the positive terminal of a battery 13, whose negative terminal is connected to ground. Collector 2*c* is similarly connected through oppositely poled diodes 14 and 15 to the positive terminal of a battery 16** whose opposite terminal is connected to ground.

Collector **1*c* is cross-coupled to base 2*b* through a resistor 17. Collector 2*c* is similarly cross-coupled to base 1*b* through a resistor 18. If desired, the resistors 17 and 18** could be replaced by Zener voltage diodes or by batteries of low internal impedance. The only limitation as to the nature of the cross-coupling impedances is that they must be conductive to direct current.

One pair of input terminals 19 and 20 is connected between base **1*b* and ground. A second pair of input terminals 21 and 22 is connected between base 2*b*** and ground. Other input arrangements may be employed, for example, the two inputs may be arranged between the respective collectors and ground.

One set of output terminals 23 and 24 is connected between collector **1*c* and ground. A complementary set of output terminals 25 and 26 is connected between collector 2*c*** and ground.

*Operation of Fig. 1*

In this description of the operation, certain potential values will be assumed for the various batteries and certain resistance values for the various resistors. It should be understood that these values are assumed for purposes of example only and that the invention is not limited to these values or any of them.

In the operation of the circuit, the voltage swings and the changes in current are all kept to minimum values, with a view to increasing the speed of switching as much as possible. The voltage swings of the collectors are less than one volt.

The limitation of the potential swing at the collectors reduces the effect of stray capacitive loading. When one of the transistors switches Off, this stray capacitance tends to charge along a potential curve varying with time and rising asymptotically toward the potential of battery 30. However, since the final potential of the collector is limited by the diodes and the battery 13 or 16, to a value which is only a small fraction of that asymptotic potential, the time required to charge to that potential is very short, since the charging takes place on the steep initial portion of the curve. In other words, the stray capacitance charges quickly, because of the low voltage through which its charge is changed.

When the transistor switches On, the charging current for the stray capacitance must flow through the constant current source, so that that charging current is minimized. The charging rate is very low and nearly linear. The voltage swings of the bases are correspondingly small. The two emitters are connected together and to a constant current source, so that their voltage does not change appreciably. Since the changes in voltage at the collector are very small as compared to the potential of the battery 9 (−30 volts) the current flows through the resistors 8 and 10 remain substantially constant. In one circuit constructed in accordance with the invention, these resistors were each 5600 ohms, so that the current was about 6 ma. The currents supplied through the resistors 6 and 7 (3600 ohms each) from the battery 5 (20 volts) are substantially constant at about 4 ma. Although the base potentials swing through a range of one volt and the collector potentials likewise swing through a range of about one volt, nevertheless each base and the opposite collector swing together, so that the potential drops across the resistors 17 and 18 are substantially constant and are approximately one volt. The resistors 17 and 18 may be 240 ohms each.

Assume that transistor 1 is Off and transistor 2 On. The collector current of transistor 1 is substantially zero. Since resistor 8 is carrying 6 ma., of which 4 ma. is supplied through resistors 7 and 17, then 2 ma. must be supplied through the diode 12, which gives a potential drop between battery 13 and collector 1*c* of the order of 0.3 volt. The potential of collector 1*c* is then approximately 4.7 volts. The potential at base electrode 2*b* is equal to the potential at collector 1*c* plus the potential drop across resistor 17 or about 5.7 volts.

Now consider transistor 2, which was assumed On. If the base 2*b* is at 5.7 volts as determined above then the emitter 2*e* must be at 6.0 volts in order to keep the transistor 2 On. The resistor 4 (3600 ohms) supplies 4 ma. from the battery 20 through emitter 2*e* and collector 2*c*. Resistors 6 and 18 also supply 4 ma. to collector 2*c*. Since resistor 10 carries only 6 ma., then 2 ma. flows through diode 14. The potential across diode 15 is about 0.3 volt and therefore the collector 2*c* potential is 5.3 volts.

The potential at base 1*b* is equal to the potential at collector 2*c* plus the drop across resistor 18, making a total of 6.3 volts at base 1*b*. Since the emitters of both transistors are tied together at 6 volts, the base-emitter impedance of transistor 1 is reversely biased so that the transistor held Off and the circuit is in a stable state with transistor 1 Off and transistor 2 On.

Note that in this condition the On transistor 2 is out of saturation by 0.4 volt, since the collector 2*c* is at a potential that much more negative than the potential of base 2*b*.

The circuit is switched from the condition just described to the opposite condition, where transistor 2 is Off and transistor 1 is On by supplying a suitable input signal to the input terminals 19 and 20, having polarity and magnitude sufficient to forwardly bias the base emitter impedance of transistor 1, thereby turning that transistor On. For example, if an input signal of minus 1 volt is supplied between terminals 19 and 20, then the potential of base 1*b* is reduced to 5.3 volts. Emitter 1*e* being at 6 volts, transistor 1 is turned On. Transistor 2 is turned Off when transistor 1 comes On by three concurrently acting cross-couplings. Transistor 1 coming On increases its collector potential about 0.6 volt, thereby reversely biasing the diode 12. This increase in collector potential is transferred through resistor 17 to base 2*b*, where it tends to reversely bias the emitter-base impedance of transistor 2. At the same time, transistor 1 in coming On robs the current from emitter 2*e*, and thereby further tends to cut Off transistor 2. The increased potential signal at base 1*b* is transmitted to collector 2 or through resistor 18. All three effects together cooperate to turn the transistor 2 Off. A new stable state is thereby set up in which the transistor 2 is held Off and the transistor 1 On.

In the example illustrated and described above, the three constant current sources are assumed equal in current flow (4 ma. each) and the two constant current drains are assumed to have a current flow equal to one and one-half times the current flow of one source. The necessary criterion for operation of the circuit is that each drain must carry a current substantially greater than the largest source current, but substantially smaller than the sum of two source currents.

FIG. 2

Figure 2:
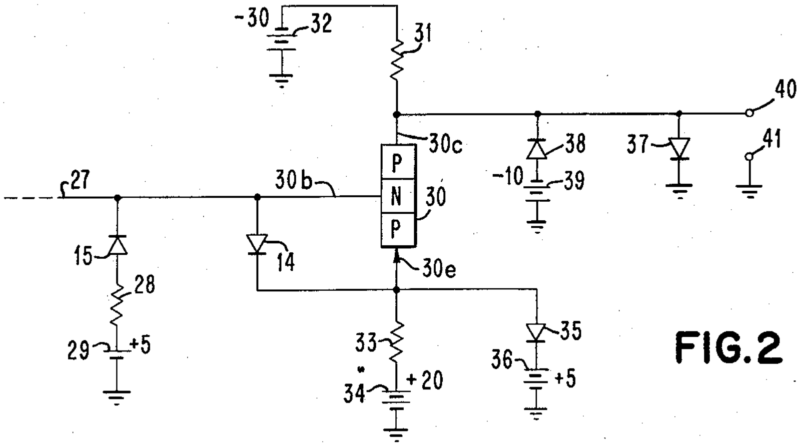
Fig. 2 is a wiring diagram of an amplifier which may be connected to an output terminal of Fig. 1.

The circuit of Fig. 1 produces output signals having a swing between On and Off values of approximately 0.6 volt. Such output signals are not sufficient for operating most computer circuits. In order to amplify such output signals, there is provided in Fig. 2 an amplifier circuit which may be substituted for the diodes 14 and 15 and related parts of the circuit of Fig. 1. In Fig. 2, there is shown the wire 27 of Fig. 1 connected to diodes 14 and 15. The diodes 14 and 15 are reversely poled, as in Fig. 1. The opposite terminal of diode 15 is connected through a resistor 28 to the positive terminal of a biasing battery 29, whose negative terminal is grounded.

The anode of diode 14 is connected to wire 27, and the cathode of that diode is connected to the emitter 30*e* of a transistor 30 having a base electrode 30*b* and a collector electrode 30*c*. Wire 27 is connected directly to base electrode 30*b*. Collector electrode 30*c* is connected through a load resistor 31 and a battery 32 to ground. Emitter 30*e* is also connected through a resistor 33 and a battery 34 to ground. Resistor 33 and battery 34 together form a constant current source. Emitter 30*e* is also connected through a diode 35 and a battery 36 to ground. The collector 30*c* is connected to ground through a double clamp including a diode 37 connected directly between collector 30*c* and ground and a diode 38 and biasing battery 39 connected between 30*c* and ground. Output terminals 40 and 41 are connected respectively to the collector 30*c* and to ground.

*Operation of Fig. 2*

The constant current source consisting of battery 34 and resistor 33 supplies current either through transistor 30 or through diode 35 to the positive terminal of battery 36. When the wire 27 swings more positive than 5 volts then the diode 14 is forwardly biased and current flows through it, making the emitter 30*e* more negative than the base 30*b* and cutting off the transistor 30. When the potential of wire 27 falls below 5 volts, then the diode 14 is reversely biased and emitter 30*e* is held above 5 volts by batteries 34 and 36, so that transistor 30 is forwardly biased and is turned On.

When transistor 30 is On, current flows through resistor 31 to battery 32, so that collector 30*c* is then at its most positive potential. The positive swing of collector 30*c* is limited to +.0.3 volt, that being the forward impedance drop across the diode 37. When transistor 30 cuts off, the negative swing of collector 30*c* is limited to minus 10.3 volts by diode 38 and battery 39.

When the transistor 2 is On, the potential drop across resistor 28 and diode 15 reversely biases the diodes 14 and 35. The difference between the potential drop across resistor 28 and diode 15 on the one hand, and the potential drop between emitter 30*e* and base 30*b* on the other hand, should be great enough to bias reversely the diode 35, so that all the current flowing from battery 34 through the resistor 33 passes through emitter 30*e* and not through diode 35.

The operation of any of the transistors described above is illustrated by the line ABCD in Fig. 3. The point A represents the Off condition of the transistor and the point D represents the On condition. The transistors are kept out of the non-linear saturation region, generally indicated at 42 in Fig. 3, by the limitations on the swing of the collector potential. When a transistor operates in the saturation region, an excess of minority current carriers, in the present instance "holes," are stored in the base region of the transistor. These stored carriers result in delay in turning the transistor from "On" to "Off". Consequently, avoidance of the saturation condition results in a circuit which switches faster.

Figure 3:
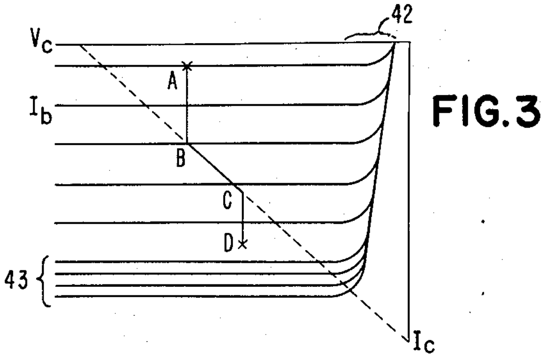
Fig. 3 is a graphical illustration of the characteristics of one of the transistors of Fig. 1.

The transistor is kept out of the non-linear alpha-crowding region indicated by the reference numeral 43 in Fig. 3 by the resistor 33 which limits the current flow through the collector 30*c*.

While I have shown and described a preferred embodiment of my invention other modifications thereof will readily occur to those skilled in the art, and I therefore intend my invention to be limited only by the limited claims.

I claim:

A clamped transistor trigger circuit comprising first and second transistors, each having base, emitter and collector electrodes, first and second constant current source means connected between a point of reference potential and the respective collectors, third and fourth constant current source means connected between the point of reference potential and the respective bases, a pair of direct current conductive impedance means connecting each base electrode with the collector electrode of the other transistor, a common connection to both emitters, a fifth constant current source connected between the point of reference potential and the common connection; first double clamp means comprising first and second diodes connected in parallel with the anode of each diode connected to the cathode of the other, means connecting one terminal of the double clamp means to the collector of one transistor, a potential source, means connecting the potential source between the other terminal of the double clamp means and the point of reference potential; second double clamp means including parallel branches connected between the collector of the other transistor and the point of reference potential, one branch including in series a third diode having its anode connected to the collector, a resistor, and a second potential source, said second branch including in series fourth and fifth diodes poled oppositely to said third diode and a third potential source; an amplifier stage including a third transistor having base, emitter and collector electrodes, the base electrode of the third transistor being connected directly to the collector of said other transistor, the emitter of the third transistor being connected to the common junction of the fourth and fifth diodes, a sixth constant current source connected between the common junction and the point of reference potential, a load resistor and a fourth potential source connected between the collector electrode of the third transistor and the point of reference potential; and third double clamp means including parallel branches connected between the third collector electrode and the point of reference potential, one branch consisting of a sixth diode and the other branch including a seventh diode poled oppositely to the sixth diode and a fifth potential source in series with the seventh diode.

References Cited in the file of this patent

UNITED STATES PATENTS

| | | |
|---|---|---|
| 1,122,748 | Mayer | July 5, 1938 |
| 2,569,345 | Shea | Sept. 25, 1951 |
| 2,622,212 | Anderson et al. | Dec. 16, 1952 |
| 2,644,887 | Wolf | July 17, 1953 |
| 2,731,571 | Chance | Jan. 17, 1956 |
| 2,816,237 | Hageman | Dec. 10, 1957 |
| 2,829,282 | Hughes et al. | Apr. 1, 1958 |
| 2,833,980 | Hedgcock | May 6, 1958 |
| 2,835,867 | Golden | May 20, 1958 |

FOREIGN PATENTS

| | | |
|---|---|---|
| 885,721 | Germany | Aug. 6, 1953 |